United States Patent
Gruhl et al.

(10) Patent No.: US 7,587,407 B2
(45) Date of Patent: Sep. 8, 2009

(54) SYSTEM AND METHOD FOR CREATION, REPRESENTATION, AND DELIVERY OF DOCUMENT CORPUS ENTITY CO-OCCURRENCE INFORMATION

(75) Inventors: Daniel Frederick Gruhl, San Jose, CA (US); Daniel Norin Meredith, Sunnyvale, CA (US)

(73) Assignee: International Business Machines Corporation, Armonk, NY (US)

( * ) Notice: Subject to any disclaimer, the term of this patent is extended or adjusted under 35 U.S.C. 154(b) by 438 days.

(21) Appl. No.: 11/442,376

(22) Filed: May 26, 2006

(65) Prior Publication Data
US 2007/0276881 A1 Nov. 29, 2007

(51) Int. Cl.
*G06F 7/00* (2006.01)

(52) U.S. Cl. ............ 707/101; 707/100; 707/200; 707/203

(58) Field of Classification Search ............ 707/203
See application file for complete search history.

(56) References Cited

U.S. PATENT DOCUMENTS

| | | | |
|---|---|---|---|
| 5,987,460 | A | 11/1999 | Niwa et al. |
| 6,442,545 | B1 | 8/2002 | Feldman et al. |
| 2002/0165884 | A1 | 11/2002 | Kreulen et al. |
| 2004/0199495 | A1 | 10/2004 | Colbath et al. |
| 2005/0143971 | A1 | 6/2005 | Burstein et al. |

*Primary Examiner*—Charles Rones
*Assistant Examiner*—Mellissa M Chojnacki
(74) *Attorney, Agent, or Firm*—John L. Rogitz

(57) ABSTRACT

To respond to queries that relate to co-occurring entities on the Web, a compact sparse matrix representing entity co-occurrences is generated and then accessed to satisfy queries. The sparse matrix has groups of sub-rows, with each group corresponding to an entity in a document corpus. The groups are sorted from most occurring entity to least occurring entity. Each sub-row within a group corresponds to an entity that co-occurs in the document corpus, within a co-occurrence criterion, with the entity represented by the group, and to facilitate query response the sub-rows within a group are sorted from most occurring co-occurrence to least occurring co-occurrence.

1 Claim, 5 Drawing Sheets

SYSTEM AND METHOD FOR CREATION, REPRESENTATION, AND DELIVERY OF DOCUMENT CORPUS ENTITY CO-OCCURRENCE INFORMATION

FIELD OF THE INVENTION

The present invention relates generally to creating, representing, and delivering entity co-occurrence information pertaining to entities in a document corpus such as the World Wide Web.

BACKGROUND

The Internet is a ubiquitous source of information. Despite the presence of a large number of search engines, however, all of which are designed to respond to queries for information by returning what is hoped to be relevant query responses, it remains problematic to filter through search results for the answers to certain types of queries that existing search engines do not effectively account for. Among the types of queries that current search engines inadequately address are those that relate in general not just to a single entity, such as a single person, company, or product, but to entity combinations that are bounded by co-occurrence criteria between the entities. This is because it is often the case that the co-occurrence criteria can be unnamed in the sense that it may not be readily apparent why a particular co-occurrence exists.

For example, consider the sentence "in their speech Sam Palmisano and Steve Mills announced a new version of IBM's database product DB2 will ship by the end of third quarter." This sentence contains the following example unnamed co-occurrences: Sam Palmisano and Steve Mills, Sam Palmisano and IBM, Sam Palmisano and DB2, Steve Mills and IBM, Steve Mills and DB2.

One might wish to inquire of a large document corpus such as the Web, "which person co-occurs most often with IBM?", but present search engines largely cannot respond to even a simple co-occurrence query like this one. Other co-occurrence questions with important implications but currently no effective answers exist, such as which medical conditions are most often mentioned with a drug, which technologies most often mentioned with a company, etc. With these critical observations in mind, the invention herein is provided.

SUMMARY OF THE INVENTION

A computer has a processor for receiving a query and a data structure to return a response to the query. The data structure includes a sparse matrix having groups of sub-rows. Each group corresponds to an entity in a document corpus, and the groups are sorted in the sparse matrix from most occurring entity to least occurring entity. Furthermore, within each group, each sub-row corresponds to an entity that co-occurs, within a co-occurrence criterion within the corpus, with the entity represented by the group. To facilitate query response, the sub-rows within a group are sorted from most occurring co-occurrence to least occurring co-occurrence.

In non-limiting implementations the data structure includes a row index that points to a starting position of a group of sub-rows in the sparse matrix. In other non-limiting implementations the data structure may include a header that in turn includes two bytes, the first of which indicates a file version and the second byte of which indicates a number of bytes used for a cardinality representing a corresponding number of entity co-occurrences. The cardinality can be expressed exactly or using a two-byte approximation.

In some embodiments described herein, the data structure may also include a string table that in turn can include an index and a corresponding data string. The index may be a concatenated list of integers representing offsets of various entity-representing strings in the data string. Preferably, the entity-representing strings in the data string are listed in descending order of frequency of occurrence in the document corpus, i.e., the entities in the data string are listed in the same order as the groups of sub-rows that represent the entities in the sparse matrix.

In another aspect, a service includes receiving a query, and returning a response to the query by accessing a data structure that has entity representations representing entities in a document corpus. The entity representations are sorted by frequency of entity occurrence within the corpus and, within an entity representation, information is further sorted by frequency of co-occurrence of other entities with the entity corresponding to the entity representation.

In still another aspect a data storage medium that is engageable with a computer for access by a processor to respond to queries contains a sparse matrix representing the co-occurrence, in a document corpus, of entity pairs.

In another aspect, a method is disclosed for establishing a data structure identifying the co-occurrence of entities in a plurality of electronic documents. The method includes, for each of at least some of the documents, classifying annotations in the document that correspond to the entities into annotation vectors for the document, and inverting the annotation vectors into a table of unique annotations and a list of the unique annotations for the document. An inner set of entities of primary interest and an outer set of entities of interest are defined for determining if a relationship exists between one of the outer entities and one of the inner entities. The method includes retrieving the lists of the unique annotations for each of the documents, determining pairs of inner entities and outer entities which occur within a proximity boundary, and if a pair occurs within the proximity boundary, comparing the unique annotations for the corresponding locations of the inner entity and the outer entity of the pair. A table is produced of all unique pairs which occurred and the number of times the pairs occurred, a sparse matrix is derived from the table.

In still another aspect, a method is disclosed for generating a data structure useful in responding to queries about co-occurrences of entities in a document corpus. The method includes accessing the corpus to determine entities and their locations to thereby establish annotation vectors, and inverting the annotation vectors such that for at least one document in the corpus, a table of unique annotations is produced and the locations on the document where the annotation occurred are recorded. The method further includes merging the table of unique annotations with lists of annotations to produce a document table and producing a final index containing all the unique annotations and lists of the documents in which they have occurred. Also, the method contemplates defining a set of inner entities and a set of outer entities, accessing document locations for inner and outer entities, and determining all pairs of inner and outer entities which occur within a proximity boundary. If a unique pair is determined to be within the proximity boundary, the pair is added to a list of all pairs. Using the list of all pairs, a table of unique pairs and the number of times each pair occurred is established, and the table is sorted into a sparse matrix.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
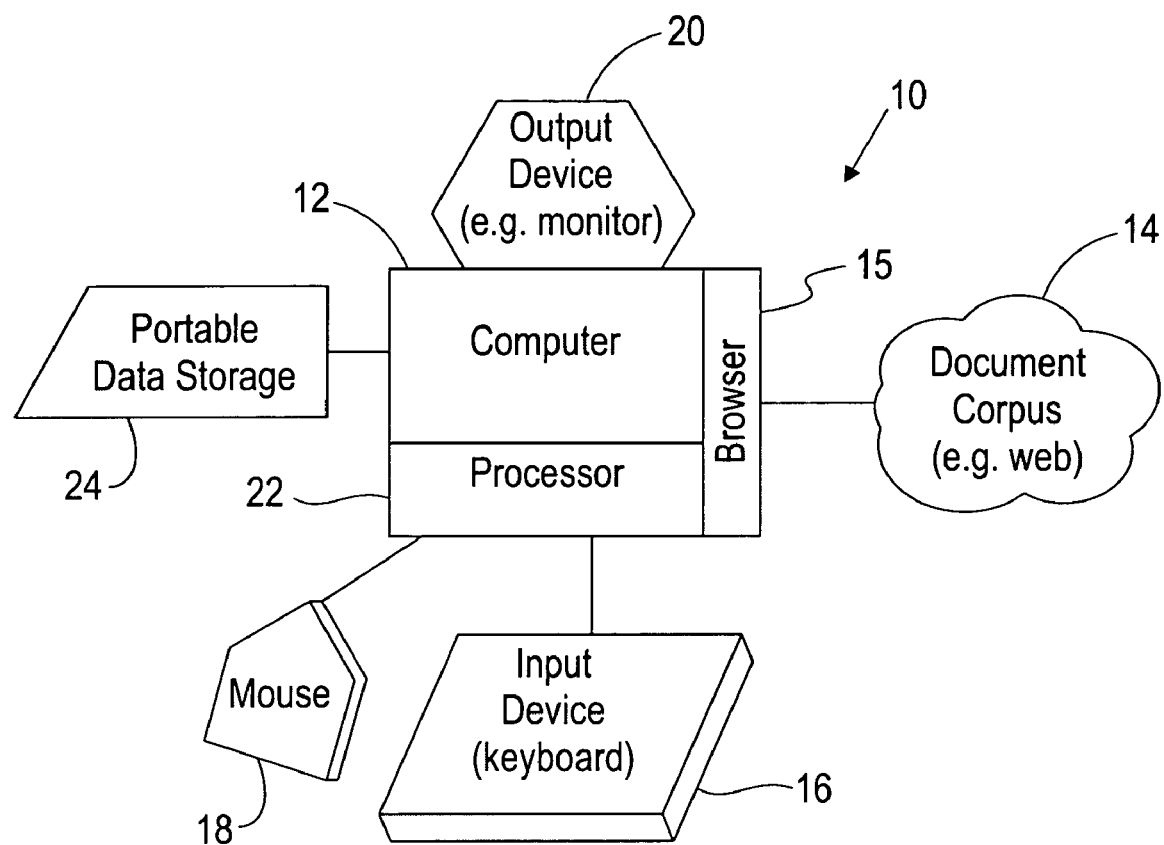
FIG. 1 is a schematic diagram of a non-limiting computer system that can be used to create and use the data structures shown herein to return responses to user queries.

Referring initially to FIG. 1, a system is shown, generally designated 10, that includes one or more computers 12 (only a single computer 12 shown in FIG. 1 for clarity of disclosure) that can communicate with a corpus 14 of documents. The corpus 14 may be the World Wide Web with computer-implemented Web sites, and the computer 12 can communicate with the Web by means of a software-implemented browser 15. The computer 12 includes input devices such as a keyboard 16 and/or mouse 18 or other input device for inputting programming data to establish the present data structures and/or for inputting subsequent user queries and accessing the data structures to return responses to the queries. The computer 12 can use one or more output devices 20 such as a computer monitor to display query results.

It is to be appreciated that the data structures below which facilitate co-occurrence querying can be provided to the computer 12 for execution thereof by a user of the computer so that a user can input a query and the computer can return a response. It is to be further understood that in other aspects, a user can access the Web or other network, input a query to a Web server or other network server, and the server can access the data structures herein to return a response to the query as a paid for service. Yet again, the data structures, owing to their compact size, may be provided on the below-described removable portable data storage medium and vended to users, who may purchase the portable data storage medium and engage it with their own personal computers to query for co-occurrences.

The computer 12 can be, without limitation, a personal computer made by International Business Machines Corporation (IBM) of Armonk, N.Y. or equivalent. Other digital processors, however, may be used, such as a laptop computer, mainframe computer, palmtop computer, personal assistant, or any other suitable processing apparatus. Likewise, other input devices, including keypads, trackballs, and voice recognition devices can be used, as can other output devices, such as printers, other computers or data storage devices, and computer networks.

In any case, the computer 12 has a processor 22 that executes the logic shown herein. The logic may be implemented in software as a series of computer-executable instructions. The instructions may be contained on a data storage device with a computer readable medium, such as a computer diskette. Or, the instructions may be stored on random access memory (RAM) of the computers, on a hard disk drive, electronic read-only memory, optical storage device, or other appropriate data storage device. In an illustrative embodiment of the invention, the computer-executable instructions may be lines of JAVA code.

Indeed, the flow charts herein illustrate the structure of the logic of the present invention as embodied in computer program software. Those skilled in the art will appreciate that the flow charts illustrate the structures of computer program code elements including logic circuits on an integrated circuit, that function according to this invention. Manifestly, the invention is practiced in its essential embodiment by a machine component that renders the program code elements in a form that instructs a digital processing apparatus (that is, a computer) to perform a sequence of function steps corresponding to those shown.

Completing the description of FIG. 1, owing to the relatively efficient, compact size (in some implementations, less than two gigabytes) of the sparse matrix and accompanying string table described herein that can be used to respond to user queries, the sparse matrix and string table may be stored on a removable data storage media 24 such as a DVD, CD, thumb drive, solid state portable memory device, etc.

Figure 2:
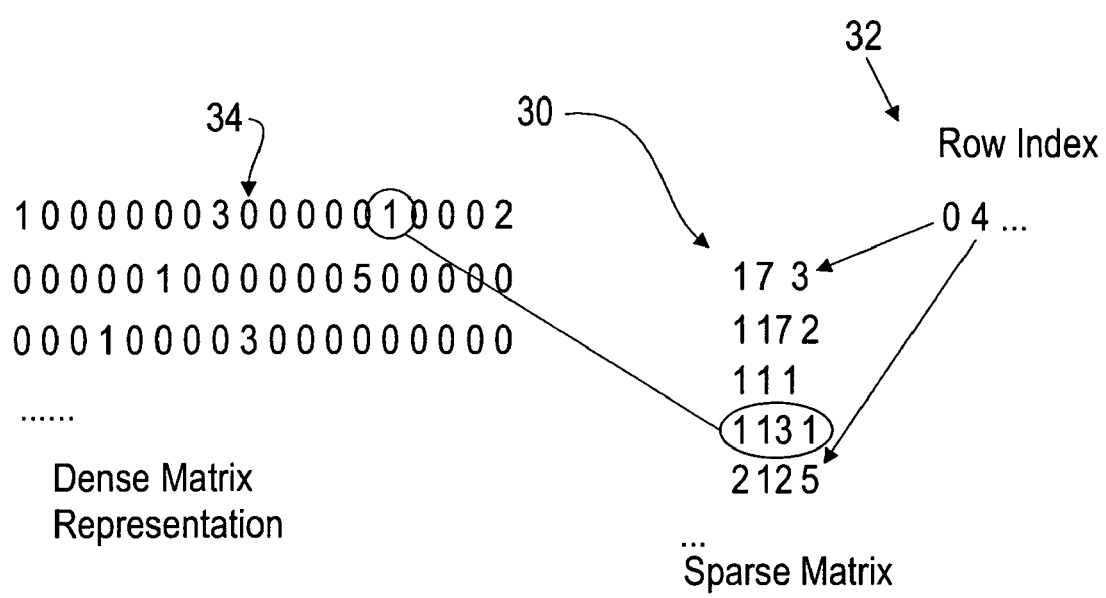
FIG. 2 is a schematic representation of the present sparse matrix with row index, along with a counterpart dense matrix representation that is shown only for illustration.

Now referring to FIG. 2, a data structure that is generated for searching for co-occurrences of entities in the document corpus 14 is shown and is referred to herein as an "s-web". Essentially, in the preferred implementation an s-web includes a header (not shown), a string table which lists the names of the entities to be considered, and a sparse matrix 30 of the co-occurrences with row index 32. As can be seen comparing the sparse matrix 30 with a corresponding dense matrix representation 34, the representation of the sparse matrix drops zeroes in the dense matrix to make the resulting data structure as compact as possible. However, the sparse matrix 30 is not merely the dense matrix 34 with the zeroes dropped, but rather is a representation of the dense matrix with zeroes dropped and data rearranged. Details of the sparse matrix will be discussed further below, but first the header and string table will be described.

First considering the header, in a preferred non-limiting implementation the header includes two bytes, the first of which indicates the file version and the second of which indicates the number of bytes used for cardinalities and offsets. Smaller tables can use less bytes per entry.

As set forth further below, as used herein a "cardinality" refers to the number of co-occurrences between two entities. The header can indicate the largest cardinality in the sparse matrix, either exactly or using a two-byte approximation (reduced format) such as a 10+6 bit mantissa and order of magnitude exponent.

The preferred non-limiting string table can have two parts, namely, an index and the corresponding data. The index is a concatenated list of integers (preferably represented using the minimum number of bytes) that provides the offsets of the various strings. String length may be calculated by subtraction from the next occurring string.

The index of the string table is followed by the per-string data, which lists each entity represented in the sparse matrix. The entities in the data portion of the string table preferably are listed in descending order of frequency of occurrence in the document corpus 14, for reasons that will become clear shortly. The string data can be compressed if desired, but should be compressed on a per string basis, so it often makes more sense to simply compress the whole file at the file system level.

In generating the string table, the entities in the document corpus are obtained as set forth further below, sorted, and then concatenated to produce the string data portion of the string table, with their offsets calculated and recorded in the index portion. Thus, a portion of the string table might appear as follows:

data portion: Dan SmithUSPTOIBM . . .

index 0 10 15 . . . , it being understood that "0" in the index points to just before "Dan Smith" (which starts at the zero position in the string data), "10" in the index points to just before "USPTO" (which starts at the tenth position in the data string), and "15" in the index points to just before "IBM" (which starts at the fifteenth position in the data string).

Returning to the sparse matrix 30, in the preferred implementation a row in the dense matrix, which represents a single entity, is broken into sub-rows in the sparse matrix, with each sub-row representing a column from the corresponding row in the dense matrix representation. Thus, a group of sub-rows in the sparse matrix corresponds to an entity in the document corpus. A column in the dense matrix representation (and hence a sub-row in the sparse matrix 30) corresponds to an entity that has satisfied the co-occurrence criteria with the row entity as further discussed below, and the value in the column indicates the number of co-occurrences of the two entities. Since most entities co-occur with only a small subset of all the entities in the corpus, the dense matrix representation is mostly composed of zeroes as shown. With this critical observation, the sparse matrix 30 is provided.

The groups of sub-rows in the sparse matrix 30 are sorted in two ways. First, the order of the groups themselves depends on the frequency of occurrence of the corresponding entities in the document corpus, i.e., the first group of sub-rows correspond to the most commonly occurring entity in the document corpus 14, the second group of sub-rows represents the second most commonly occurring entity, and so on. This method of sorting facilitates responding to queries such as "what is the most common cough syrup mentioned on the web?" Recall that the entities in the string table data portion are similarly sorted, i.e., the first string is the most commonly occurring entity and so on.

Thus, as shown in FIG. 2, the first group of sub-rows (those beginning with the numeral "1") correspond to a single entity, in fact the most frequently occurring entity in the document corpus. To further conserve space, the first numeral of each sub-row of the sparse matrix 30 may be dropped in implementation, with the row index 32 being used to point to the beginning of each new group of sub-rows as shown.

The second numeral in each sub-row represents a non-zero column from the dense matrix representation, and the third numeral represents the value in the column. In the example shown in FIG. 2, there are four sub-rows in the first group, with the first sub-row indicating that a value of "3" corresponds to column "7", the second sub-row indicating that a value of "2" corresponds to column "17", the third sub-row indicating that a value of "1" corresponds to the first column, and the fourth sub-row indicating that a value of "1" corresponds to the thirteenth column.

Accordingly, the second way in which the sparse matrix 30 is sorted may now be appreciated. Not only are the groups of sub-rows intersorted by frequency of occurrence of the corresponding entities, but within each group, the sub-rows are intrasorted by cardinality, with the sub-row indicating the highest number of co-occurrences first, the sub-row indicating the second-highest number of co-occurrences second, and so on. This second way in which the sparse matrix 30 is sorted thus facilitates responding to queries such as "which cough syrups are most often co-mentioned with aspirin?"

Figure 3:
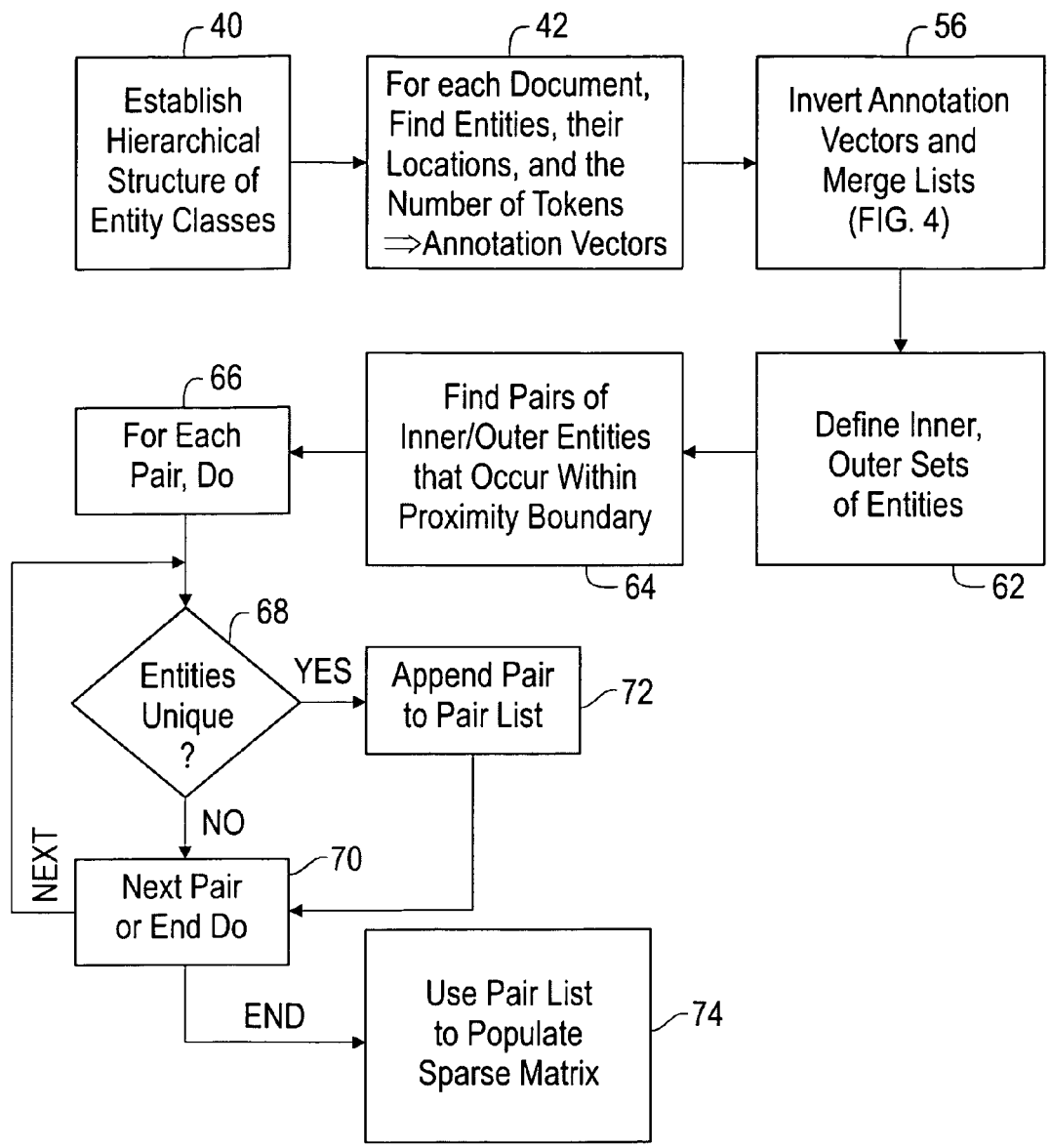
FIG. 3 is a flow chart of the logic for establishing the sparse matrix.
Figure 4:
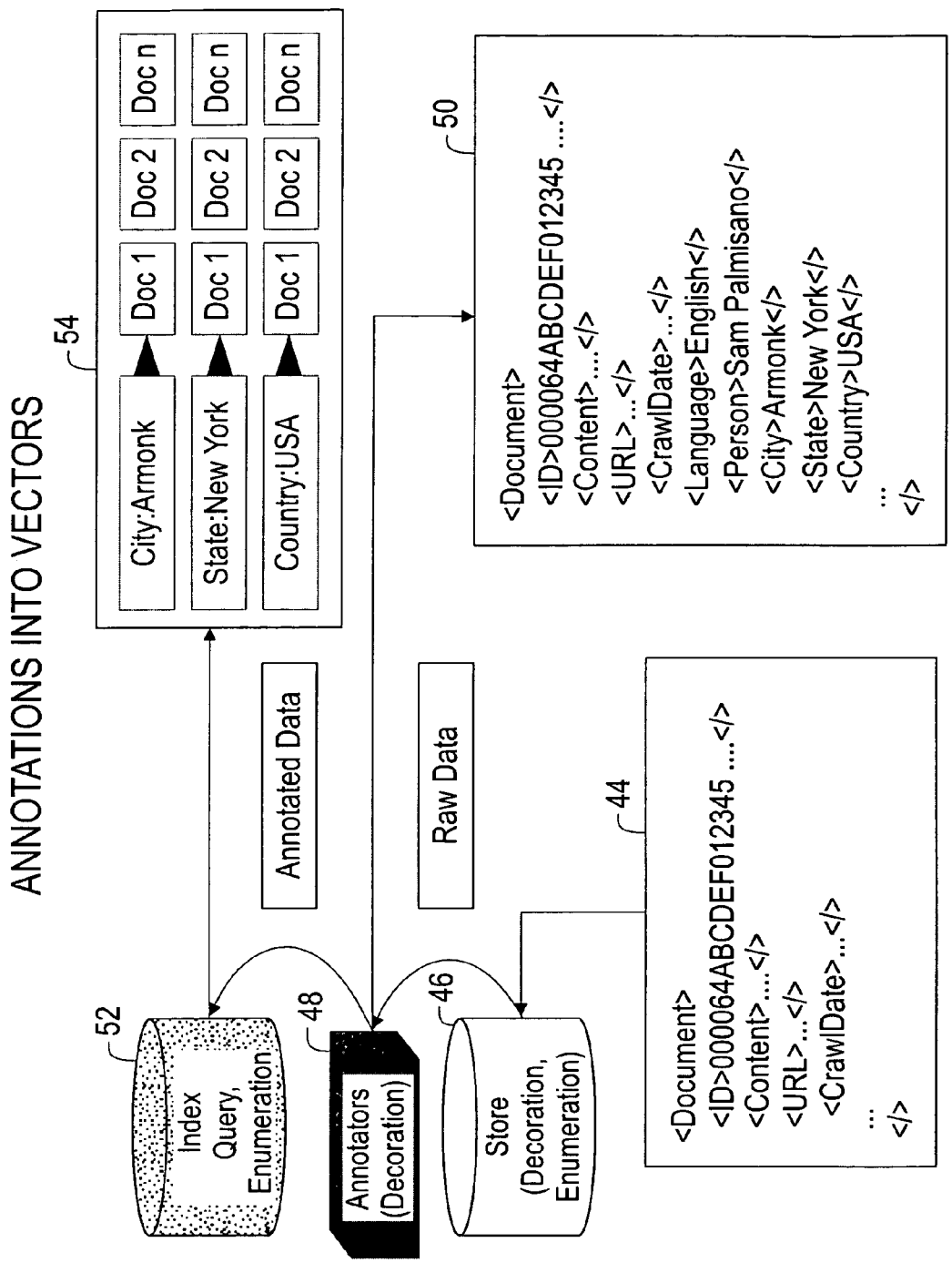
FIGS. 4 and 5 show various data structures that can be used as part of the logic of FIG. 3.
Figure 5:
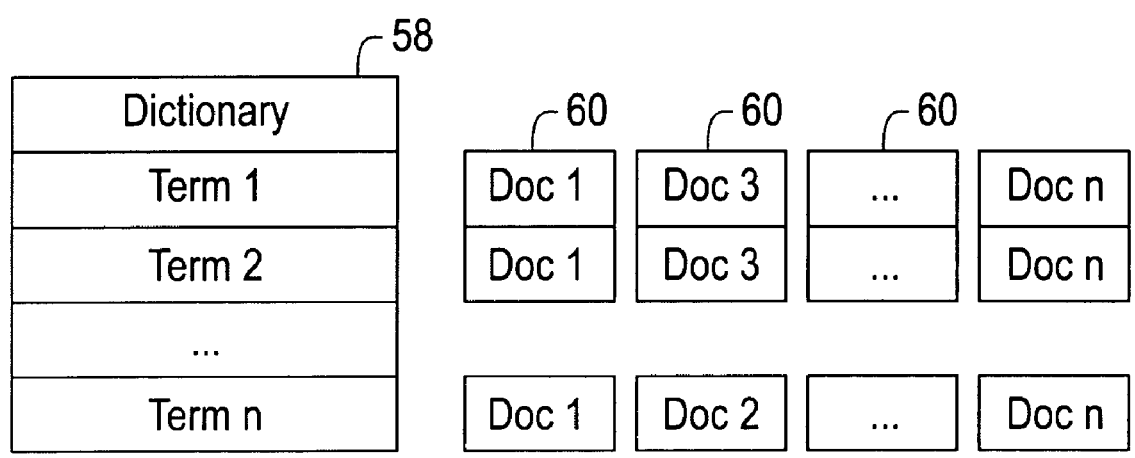

FIGS. 3-5 illustrate how the data structures discussed above can be generated. Commencing at block 40, a hierarchical structure of entity classes may be established. More specifically, consider that entities can be regarded as annotations which have been placed on a document either manually or automatically via an algorithm. In a non-limiting implementation each entity can be an unstructured information management architecture (UIMA) annotation which records the unique identifier of the entity, its location on the document, and the number of tokens by which the entity is represented. This information is then compiled into a vector of annotations per document as set forth further below. Block 40 recognizes that many annotations fall into classes of annotation, and entities are no different. In the example in the background, "Sam Palmisano" and "Steve Mills" are both of the "People" class of entities, whereas the annotation "IBM" is of the Organization class and "DB2" can be considered part of the Product class of entities. This non-limiting illustrative classification allows for a simple hierarchical structure of entities to be created:

/Entity/People/Sam Palmisano
/Entity/People/Steve Mills
/Entity/Organizations/IBM
/Entity/Products/DB2

When annotations are classified and structured in this manner, the logic can move to block 42 to examine each document (or a relevant subset thereof) in the corpus and determine entities, their locations, and the number of tokens associated with each entity to thereby establish annotation vectors. Multiple annotations may be produced at a given annotation location, e.g., at the location in a document of "Sam Palmisano", annotations for "Entity", "Entity/People", and "Entity/People/Sam Palmisano" can be produced.

FIG. 4 illustrates how annotation vectors are generated. While the example documents in FIG. 4 are in Web markup language, the invention is not limited to a particular format of document.

As shown, a raw document 44 with document ID, content, and other data known to those of skill in the art (crawl date, URL, etc.) can be stored at 46 and then operated on by an annotator 48 to produce an annotated document 50, which lists, among things, various entities in the document as shown. The annotated document 50 may also be stored at 46. An index component 52 then accesses the annotated documents 50 to produce annotation vectors 54, showing, for each entity, the documents in which it appears.

Proceeding to block 56 in FIG. 3, the annotation vectors are inverted by a software-implemented indexer such that for each document, a table of unique annotations is produced and the locations on the document where the annotation occurred are recorded. Within a non-limiting indexer, the location, span and unique entity identifiers are recorded for each location. When a given annotation has occurred more than once on a document, the annotation locations are structured as a list of annotations, sorted by the order the individual annotations occurred in the document. If an annotation is unique on a document, the table can be considered to point at a location list with a size of one.

Briefly referencing FIG. 5, as more documents are processed by the indexer, a unique annotation table 58 (referred to herein a dictionary) and the corresponding annotation lists are merged to produce the document table 60. Once all documents have been processed a final index as shown in FIG. 5 is produced which contains all the unique annotations and lists of the documents in which they have occurred, also preferably with the location within a document of each occurrence. The data structure of FIG. 5 facilitates efficient entity (term) lookup, efficient Boolean operations, and efficient storage of a large number of data records.

Returning once again to FIG. 3, the logic next moves to block 62 to define a set of inner entities and a set of outer entities. Notionally, the inner entities define the sub-row groups and the outer entities define the sub-rows within a group in the sparse matrix 30 of FIG. 2.

Thus, the inner set is the class of entities of primary interest. The inner set can be the set of all entities, or a subset of all entities. The outer set is the class of entities of interest for determining if a relationship exists between that entity and an inner entity, and this set may also be the set of all entities or only a subset thereof.

Once the classes of entities are defined, the lists of document locations for those classes are retrieved from the indexer, i.e., the data structures of FIGS. 4 and 5 are accessed. At block 64 the lists are scanned sequentially to determine all the pairs of inner and outer entities which occur within a given proximity boundary. Proximity boundaries can be within the same sentence, paragraph, document, or within a fixed number of tokens.

When a pair is determined to be within the proximity constraint, at block 66 a loop is entered in which the unique entity identifiers stored within the two locations are compared to each other at decision diamond 68 to ensure that the entities are unique. If they are the same, the process accesses the next pair (assuming the Do loop is not complete) at block 70 and loops back to decision diamond 68. On the other hand, if the entities are unique from each other the pair is appended to a list of all pairs which have been discovered at block 72.

Once the lists of locations have been exhausted (i.e., the DO loop is complete), the list of pairs is processed at block 74 to produce a table of all unique pairs which occurred and the number of times the pair occurred. This table is sorted in accordance with principles discussed above into the sparse matrix 30 of FIG. 2. The string table is likewise produced using the lists in FIGS. 4 and 5.

To execute a query, the sparse matrix 30 and string table may be used as follows. It is to be understood that other sparse matrices less preferably may be used, but in the preferred implementation the sparse matrix 30, advantageously ordered as discussed above, is used.

For an example query "which "N" medical conditions are most often mentioned with drug X?", the string table (which, recall, has the same order of entities as the sparse matrix) is accessed to locate the drug X (and hence the position of its group of sub-rows in the sparse matrix). Then the sparse matrix is accessed using the drug entity as entering argument, and the column represented by the highest sub-row in the group corresponding to a medical condition is retrieved. Since the sub-rows are in order of cardinality, the first sub-row indicates the entity in the corpus having the most co-occurrences with the drug X, and it is examined to determine whether it corresponds to a co-occurring entity that is classified as a "condition". If not, the next sub-row is examined, and so on, until the highest cardinality "N" sub-rows indicating the most frequently co-occurring conditions are identified. The result is then returned. For a simpler query, e.g., "which drug is most often mentioned on the Web", the string table is accessed from the beginning to find the highest cardinality entity that has been classified as a drug, and the result returned.

An s-web of around thirty thousand co-occurrence entries may be smaller than two gigabytes. This means that these "co-occurrence snapshots" can fit easily on removable media (DVD, CD, thumb drive, etc). Applications can be included on this media as well, allowing stand alone delivery of these facts which customers can explore to discover actionable business insights.

While the particular SYSTEM AND METHOD FOR CREATION, REPRESENTATION, AND DELIVERY OF DOCUMENT CORPUS ENTITY CO-OCCURRENCE INFORMATION is herein shown and described in detail, it is to be understood that the subject matter which is encompassed by the present invention is limited only by the claims.

What is claimed is:

1. A computer-implemented method executable by a computer accessing a tangible computer-readable medium, the method establishing a data structure identifying the co-occurrence of entities in a plurality of electronic documents comprising:

for at least some of the documents, classifying annotations in a document that correspond to the entities into annotation vectors for the document;

for at least some of the documents, inverting the annotation vectors into a table of unique annotations and a list of the unique annotations for the document;

defining an inner set of entities of primary interest comprising inner entities;

setting an outer set of entities of interest comprising outer entities to determine whether a relationship exists between one of the outer entities and one of the inner entities;

retrieving the lists of the unique annotations for each of the documents;

determining pairs of inner entities and outer entities which occur within a proximity boundary; in response to a pair occuring within the proximity boundary, comparing the unique annotations for the corresponding locations of the inner entity and the outer entity of the pair;

producing a table of all unique pairs which occurred and the number of times the pairs occurred; and deriving a sparse matrix from the table, wherein the inverting comprises recording location, span, and unique identifiers for each of the unique annotations, wherein in response to a particular annotation having occurred more than once in the document, structuring the locations of the annotations as a list of annotations, sorted by the order in which the individual annotations occurred in the document, wherein the defining comprises setting the inner set as the set of all entities, wherein the setting comprises making the outer set a set of all entities.

* * * * *